No. 815,275. PATENTED MAR. 13, 1906.
J. F. DORNFELD.
MALT STIRRING APPARATUS.
APPLICATION FILED APR. 18, 1903.
3 SHEETS—SHEET 2.
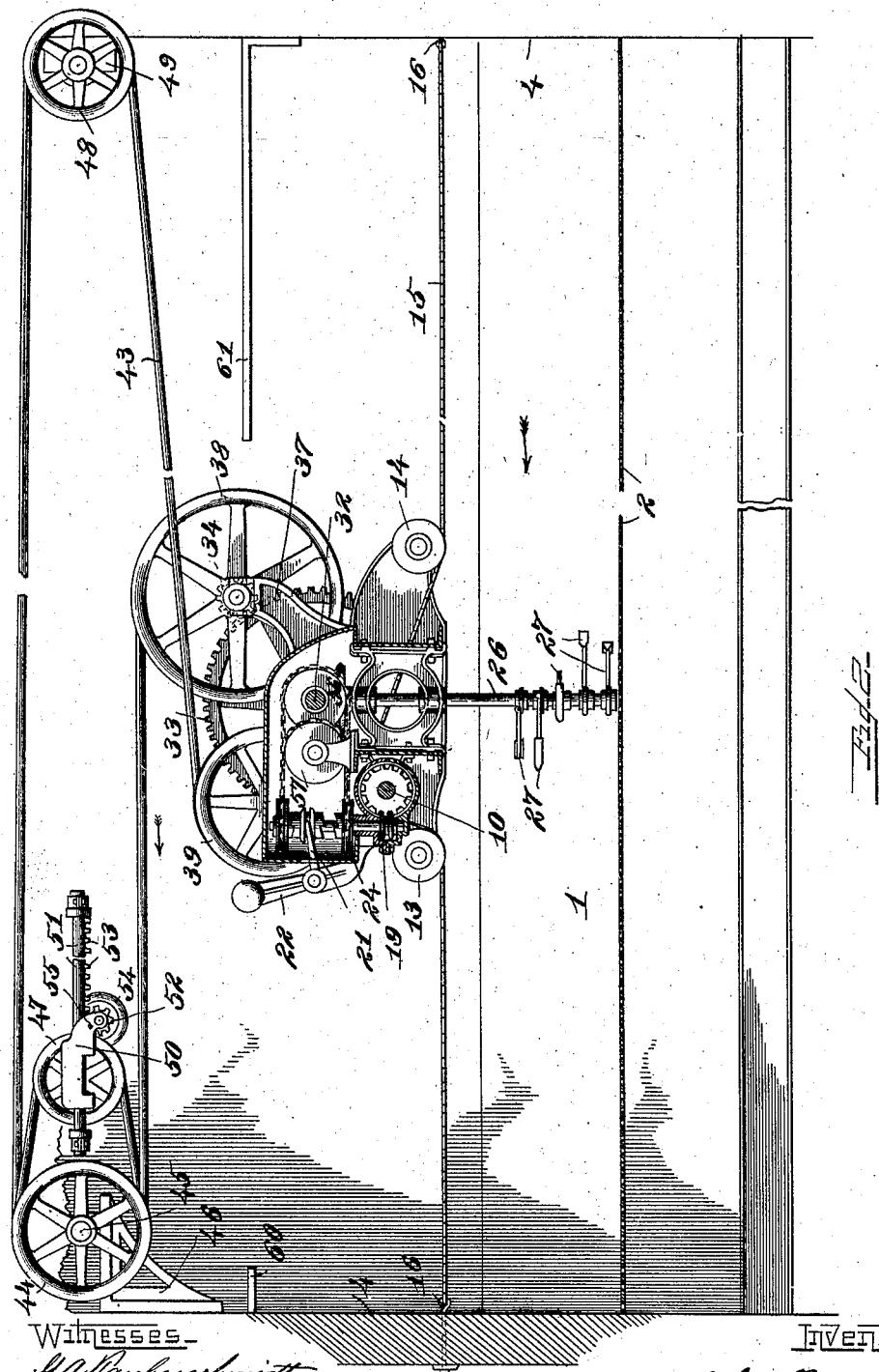

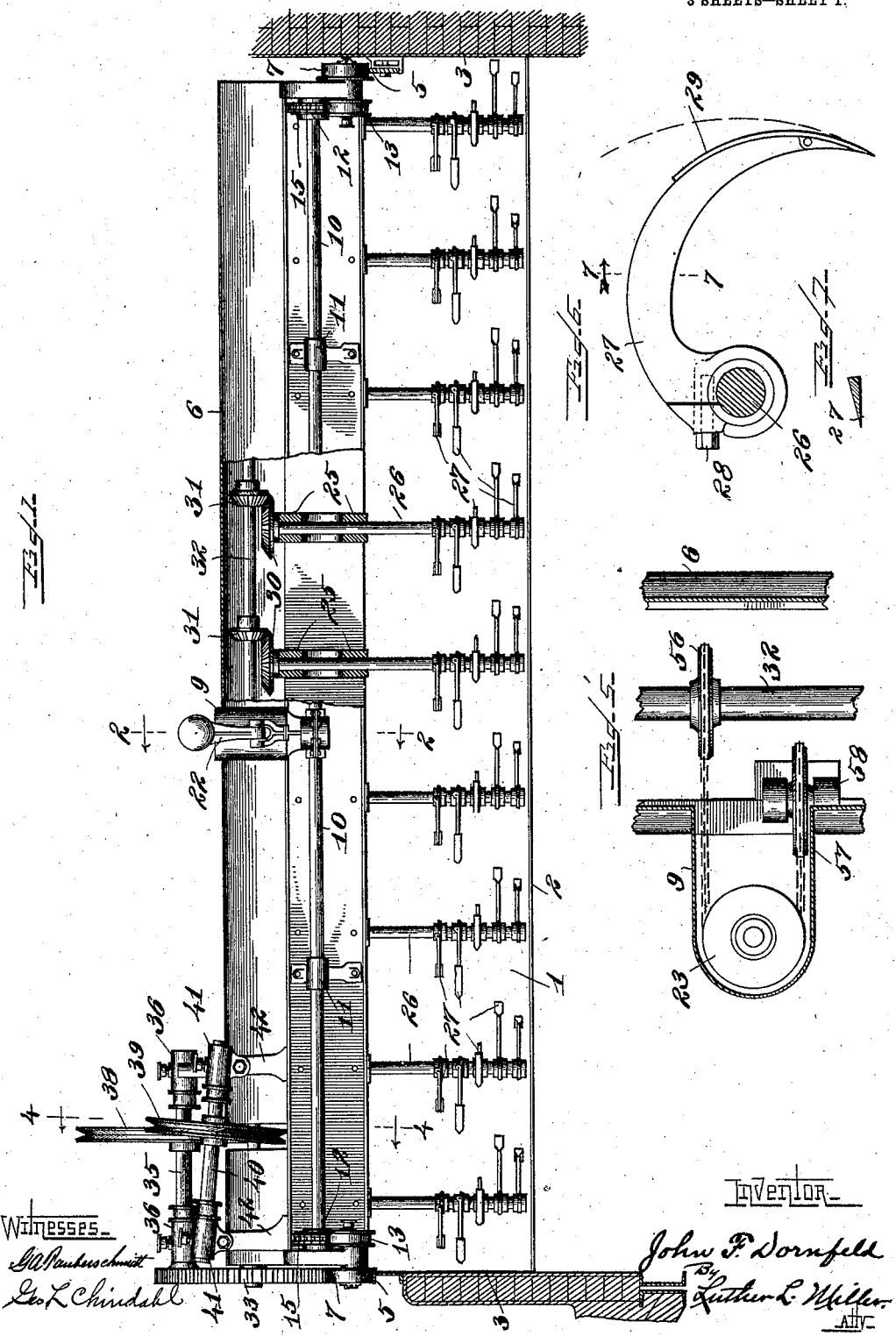

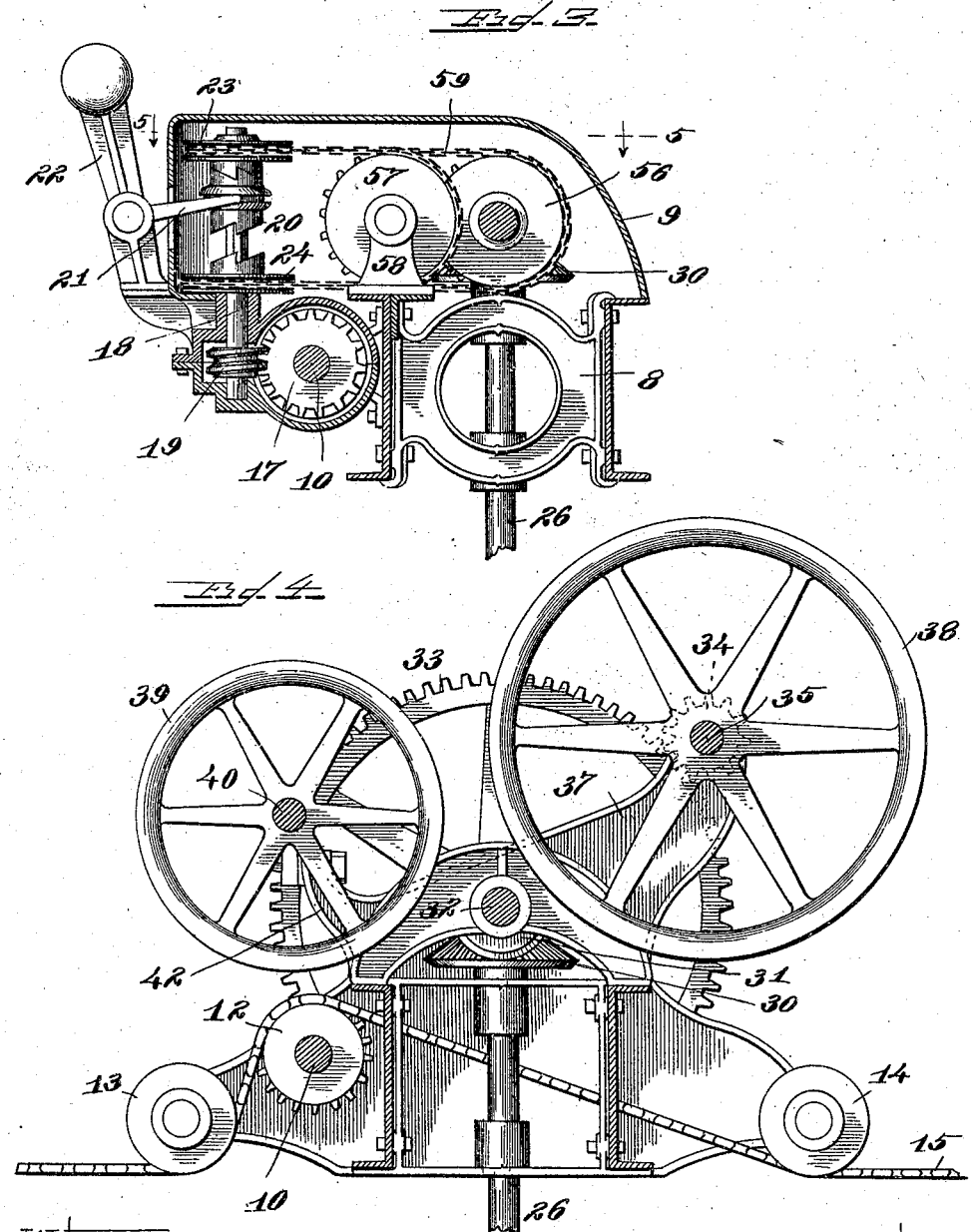

UNITED STATES PATENT OFFICE.

JOHN F. DORNFELD, OF CHICAGO, ILLINOIS.

MALT-STIRRING APPARATUS.

No. 815,275.      Specification of Letters Patent.      Patented March 13, 1906.

Application filed April 18, 1903. Serial No. 153,189.

*To all whom it may concern:*

Be it known that I, JOHN F. DORNFELD, a citizen of the United States, residing at Chicago, in the county of Cook and State of Illinois, have invented certain new and useful Improvements in Malt-Stirring Apparatus, of which the following is a specification.

The object of this invention is the production of a traveling stirring mechanism adapted to pass over a body of grain being malted and stir the same, so as to separate the kernels for the free passage of air through the mass, and to accomplish this result without causing a bodily or wave movement of the grain in the direction of travel of the stirring mechanism.

The invention further refers to an improved traveling mechanism for carrying and actuating the stirring device.

The invention also refers to an automatic means for halting the carriage at a certain predetermined point in its travel.

The invention further refers to various improvements, both in general construction and in detail, of a malt-stirring apparatus embodying the inventive ideas hereinbefore outlined.

In the accompanying drawings, Figure 1 is a front elevation of this improved malt-stirring apparatus, the walls of the malt-receptacle being in section. Fig. 2 is a transverse section through the stirring mechanism on dotted line 2 2 of Fig. 1. Fig. 3 is an enlarged detail view on the same plane as Fig. 2, showing the mechanism for moving the stirrer-carriage. Fig. 4 is an enlarged detail sectional view on dotted line 4 4 of Fig. 1. Fig. 5 is a horizontal section on dotted line 5 5 of Fig. 3. Fig. 6 is a top plan view of one of the stirrer-arms. Fig. 7 is a transverse sectional view through a stirrer-arm, taken on dotted line 7 7 of Fig. 6.

In the embodiment herein shown of this invention a carriage adapted to be moved upon a suitable track forward and backward over a malt-receptacle is provided, which carriage is fitted with vertical rotatable shafts extending downward from said carriage and bearing near their lower ends curved stirrer-arms projecting from said shafts. Each of these stirrer-arms carries at its outer end a curved blade or paddle pivotally connected with the stirrer-arm. The free pivotal movement of these blades with reference to their supporting-arms permits the blades to pass through the body of the grain without causing a bodily or wave movement of the grain from one end of the receptacle to the other, merely loosening the grain, as the blade assumes with relation to its supporting-arm an angle dependent upon both the speed of the blade in its orbit and the speed of its bodily advance through the malt-receptacle. This angle also differs with the direction of travel of the carriage.

In the construction of this apparatus I provide a malt-receptacle 1, having a perforated bottom 2, side walls 3, and end walls 4. Upon the side walls 3 I mount the traction-rails 5. A carriage 6 of a length about equal to the width of the malt-receptacle 1 is provided with the traction-wheels 7 at its opposite ends, which wheels run upon the traction-rails 5, whereby the carriage may be moved forward and back throughout the length of the malt-receptacle.

The carriage 6 comprises a framework 8 and a hood 9, rising above said framework to cover the operating mechanism. A feed-shaft 10, rotatably mounted in bearings 11 at one side of the framework 8, carries at each of its opposite ends a sprocket-wheel 12, fixed to said shaft 10. On each side of and somewhat below the sprocket-wheels 12 are two guide-sheaves 13 and 14, each rotatably mounted upon the carriage 6, near the forward and rear sides thereof, and alined with the sprocket-wheels 12. Along each of the side walls 3 of the malt-receptacle a length of sprocket-chain 15 extends, said chains being secured at their ends to the end walls 4 by means of eyes 16, and intermediate said ends each chain passes underneath the guide-sheaves 13 and 14 and over the sprocket-wheel 12 at the end of the carriage 6 adjacent to the side of the receptacle along which the chain passes. Near the center of the carriage 6 the feed-shaft 10 carries a worm-wheel 17, and adjacent thereto and rotatively mounted in suitable bearings upon the carriage 6 is a vertical shaft 18, carrying near its lower end a worm 19, which meshes with the teeth of the worm-wheel 17. The vertical shaft 18 carries a clutch member 20, splined thereto, but free to be moved lengthwise of said shaft by means of the pivoted L-shape lever 21, one arm of which engages with said sliding clutch member. The other arm 22 of said lever is weighted and extends upwardly into a position to be engaged by automatic shifting-stops to be hereinafter described. At either side of the clutch member 20 the vertical shaft 18 carries a chain-wheel 23 and 24, having clutch-hubs adapted to be engaged by the clutch member 20.

The means for driving the stirring-shafts and moving the carriage will next be described. At intervals throughout the length of the framework 8 of the carriage 6 I mount in the bearings 25 stirrer-shafts 26, extending downwardly from said carriage, each of said shafts bearing at its lower end several stirrer-arms 27, which arms are secured to the stirrer-shafts in any suitable manner—such, for instance, as a pinch fit tightened by means of the locking-screws 28. The stirrer-arms are formed with an angular forward edge and upon their ends carry pivotally-mounted curved stirrer-blades 29. The pivotal movement of the stirrer-blades 29 with reference to the stirrer-arms 27 is limited by the form of the end of the arm adjacent to the point of pivotal connection between the arm and the blade. At its upper end each of the stirrer-shafts bears a miter-gear 30, adapted to mesh with similar gears 31, which gears 31 are fixed at intervals upon a drive-shaft 32, extending longitudinally of and rotatably supported on the carriage 6 in suitable bearings fixed thereon. The drive-shaft 32 carries at one of its ends outside said carriage a large spur-gear 33, and meshing therewith is a pinion 34, fixed upon a shaft 35, mounted in suitable bearings 36 in the arms 37, extending upwardly from the carriage 6. A drive-sheave 38 is fixed upon the shaft 35, and adjacent to said drive-sheave is a guide-sheave 39, mounted upon a tilted shaft 40. This tilted shaft is rotatably supported in bearings 41, carried by the arms 42, which arms are fixed to the carriage and extend upwardly therefrom. The drive-sheave 38 carries an endless cable 43, which passes over said drive-sheave 38 to a double-grooved sheave 44, fixed upon a power-shaft 45, rotatably mounted in suitable bearings supported by the bracket 46, which bracket is secured to one of the end walls 4 of the malt-receptacle 1. From the sheave 44 the cable passes over a tightener-sheave 47, supported in a manner to be hereinafter described, back to the sheave 44, and across the malt-receptacle to a guide-sheave 48, rotatably mounted in bearings 49, supported upon the opposite end wall 4. From the sheave 48 the cable passes around the guide-sheave 39 to the drive-sheave 38. The tightener-sheave 47 is rotatably mounted in a bracket 50, slidably supported upon a guide-rod 51, which bracket also supports a pinion 52, adapted to mesh with rack-teeth 53, formed upon the guide-rod 51. The bracket 50 may be moved forward and backward upon said guide-rod 51 by rotating the hand-wheel 54, fixed with relation to the pinion 52, and may be locked at any point upon said guide-rod by means of the locking-pin 55, extending through a portion of the bracket and lying in the space between adjacent teeth of said pinion.

Power is transmitted from the drive-shaft 35 upon the carriage 6 to the vertical shaft 18 by the following-described mechanism: A chain-wheel 56 is fixed upon the drive-shaft 32 near the middle portion thereof, and a similar (idler) chain-wheel 57 is rotatably supported in bearings 58, fixed upon the framework of the carriage 6. A chain 59 passes over the chain-wheels 56 and 57, passing intermediately over the chain-wheels 23 and 24 on the vertical shaft 18. The two chain-wheels 23 and 24 are thus constantly rotated in contrary directions, the direction of rotation of the vertical shaft 18 depending upon the position of its clutch member 20. When the clutch member 20 is in engagement with the clutch-hub of the chain-wheel 23, the vertical shaft 18 is rotated in one direction, and by reason of the worm-gear connection between said vertical shaft and the feed-shaft 10 the carriage 6 is moved. When the clutch member 20 is in engagement with the clutch-hub of the chain-wheel 24, the direction of rotation of said vertical shaft 18, and consequently the direction of travel of the carriage 6, is in the contrary direction. Stops 60 and 61 are secured to the end walls 4 of the malt-receptacle 1 at opposite points thereon and project inwardly toward the center of said receptacle. These stops are in a position to engage the arm 22 of the L-shape lever 21 and by the traveling movement of the carriage to move the L-shape lever and shift the clutch member 20 from engagement with either one of the clutch-hubs of the chain-wheels 23 and 24 into an intermediate position, stopping the travel of the carriage 6.

The sprocket feed-chains 15, comprising a part of the carriage-moving mechanism, are much better adapted for this purpose than racks would be. Racks are likely to become clogged with malt, which malt is rolled into the toothed faces of the racks and accumulating therein and becoming hard interferes with the smooth operation of the carriage. The chains 15 are light, readily adaptable and adjustable, durable, self-cleaning of malt, and in all ways preferable to rack-bars and pinions as a carriage-feed.

In operation malted grain or other grain to be stirred is placed in the malt-receptacle 1 and power communicated to the driving and moving mechanisms of the carriage 6 by means of the cable 43. The movement of the cable produces a rotatory movement of the stirrer-shafts 26 and causes the stirrer-blades 27 to move in their orbits about their respective supporting-shafts. The rotation of the stirrer-shafts is always in one direction. The rotatory movement of the drive-shaft 32 is also communicated, by means of the vertical shaft 18 and its worm-gearing 17 and 19, to the feed-shaft 10 to move the carriage upon the traction-rails 5 lengthwise of the malt-receptacle 1. The direction of this travel depends upon the position of the clutch member 20. In the position it is represented to occupy in Fig. 2 the direction of travel of the carriage is from right to left, as indicated by the arrow in said figure. The angle of inclination assumed by the stirrer-blades 29 with relation to their respective arms 27 is variable, depending upon the rapidity of their forward travel with relation to their rotatory movement, also having regard to the density of the mass of grain through which they pass. These blades being pivotally mounted upon the outer ends of the stirrer-arms are free to assume the position offering the least resistance to their movement through the grain. The curve of the blade being of a smaller radius than its orbit about the center of the stirrer-shaft, its passage through the grain tends further to mix or stir it. In Fig. 6 the outward extremity of the pivotal movement of the blade is indicated by the dotted line $x$, which line also represents the radius of the rotative movement of the blade. The forward edge of each of the stirrer-arms is made thin or sharp in order that said arms shall pass through the grain with the least possible resistance.

From the foregoing it is clear that the stirrer-blades have three movements—to wit, a bodily travel due to their connection with the carriage 6, an orbital movement about the rotative center of their vertical shafts 26, and an automatic adjusting movement on their supporting-pivots.

As the carriage 6 travels forward and backward upon its supporting-rails first one side and then the other side of the carriage is "in front," depending upon the direction of said travel. This "front" side may be termed the "advance" side of the carriage. When the blade 29, cutting through the body of malt, approaches the advance side of its orbit, it is forced through hard or packed malt. The forward travel of the carriage causes the blade to be pressed sidewise against the body of malt, and owing to the fact that the end of said blade rearward of the pivotal side thereof is considerably longer than the forward end or point said blade is inclined upon its pivot and its point caused to project, the consequence of which is that the blade makes a wider path at the advance side of its orbit than at the rear side of the orbit. At the relatively "rear" side of its orbit an effect directly opposite to that just described occurs. Here the pressure of the body of grain falling upon the concave face of the blade and the grain having been loosened at the advance side of the orbit said blade is merely drawn through the grain without disturbing the position of said grain to any considerable extent, whereby bodily travel or wave movement of the mass of grain is obviated.

The apparatus herein illustrated and described is susceptible of many modifications in the form and arrangement of its parts without a departure from the spirit and scope of my invention, wherefore I do not limit myself to the particular construction herein set forth.

I claim as my invention—

1. A curved stirrer-arm for malt-stirring apparatus, said arm having a sharpened outer edge and being provided with a blade pivoted to its forward end.

2. A curved stirrer-arm for malt-stirring apparatus having a blade pivoted to its forward end, which blade is provided with a wedging-point.

3. In a malt-stirring apparatus, in combination, a stirrer-arm having a blade pivotally supported with reference thereto; means for moving said arm forward and backward; and means for rotating said arm in the plane of its to-and-fro travel.

4. In a malt-stirring apparatus, in combination, a stirrer-arm having a blade pivotally mounted thereon near its outer end; means for moving said arm forward and backward; and means for rotating said arm in the plane of its to-and-fro travel.

5. In a malt-stirring apparatus, in combination, a curved stirrer-arm having a sharpened outer edge and a blade pivoted to its forward end; means for rotating said arm; and means for moving said arm forward and backward.

6. In a malt-stirring apparatus, in combination, a traveling carriage; a shaft supported in said carriage, which shaft is adapted to be rotated in the plane of the travel of its carriage; and a stirrer-arm fixed to said shaft, which arm has a blade pivoted to its forward end.

7. In a malt-stirring apparatus, in combination, a traveling carriage; a rotatable shaft supported in said carriage; and a curved stirrer-arm fixed to said shaft, which arm has a sharpened forward edge and a blade pivoted to its forward end.

8. In a stirring apparatus, in combination, a pivotally-supported stirrer-blade adapted to be passed through the substance to be stirred; means for advancing the blade bodily; and means for moving the blade in an orbit lying in the plane of the advancing movement of said blade.

9. In a malt-stirring apparatus, in combination, a traveling carriage; means for supporting said carriage; a stirrer-shaft rotatably mounted in said carriage; a stirrer-arm fixed with relation to said stirrer-shaft; a blade pivoted to the forward end of said stirrer-arm; a drive-shaft; a gear connection between said drive-shaft and said stirrer-shaft; a feed-shaft mounted on said carriage; a feed-chain stationary with reference to the travel of said carriage; a drive connection between the feed-shaft and said feed-chain; and a differential driving connection between the drive-shaft and the feed-shaft, whereby the feed-shaft may be rotated in either direction.

10. In a malt-stirring apparatus, in combination, a traveling carriage; means for supporting said carriage; vertical stirrer-shafts rotatably mounted in said carriage; a curved stirrer-arm fixed upon the lower end of each of said stirrer-shafts; a blade pivoted to the forward end of each of said stirrer-arms; a drive-shaft; gear connections between said drive-shaft and said stirrer-shafts; a feed-shaft mounted on said carriage; a feed-chain stationary with reference to the travel of said carriage; a drive connection between the feed-shaft and said feed-chain; and a differential driving connection between the drive-shaft and the feed-shaft, whereby the feed-shaft may be rotated in either direction.

11. A stirrer-blade for rotary stirring apparatus, having a body portion curved, with a radius smaller than that of its orbital movement.

12. A stirrer-blade for rotary stirring apparatus, pointed at its forward end and having a body portion curved, with a radius smaller than that of its orbital movement.

13. A stirrer-blade for rotary stirring apparatus, having a body portion curved, with a radius smaller than that of its orbital movement, and adapted to be pivotally supported at a point nearer to one of its ends than the other.

JOHN F. DORNFELD.

Witnesses:
L. L. MILLER,
GEORGE L. CHINDAHL.